Oct. 7, 1947.   H. A. TUNSTALL   2,428,480
BUOYANT ELECTRIC CABLE
Filed Aug. 25, 1942   4 Sheets-Sheet 1
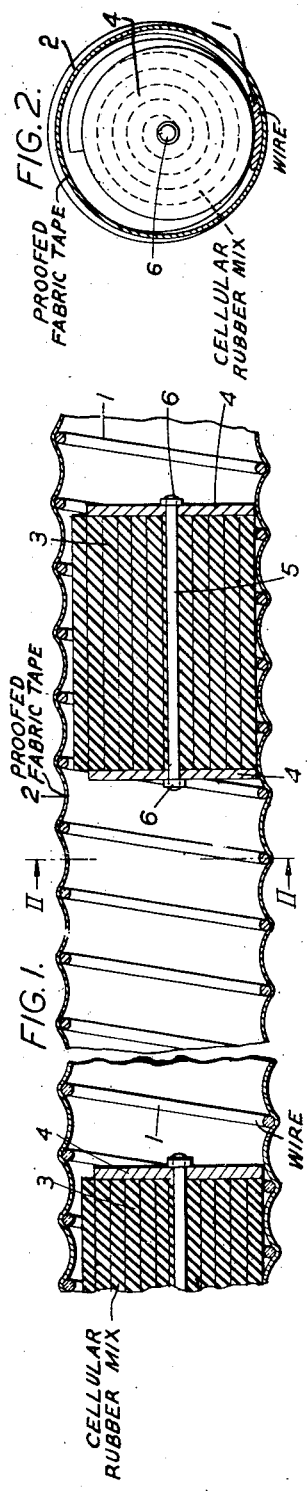
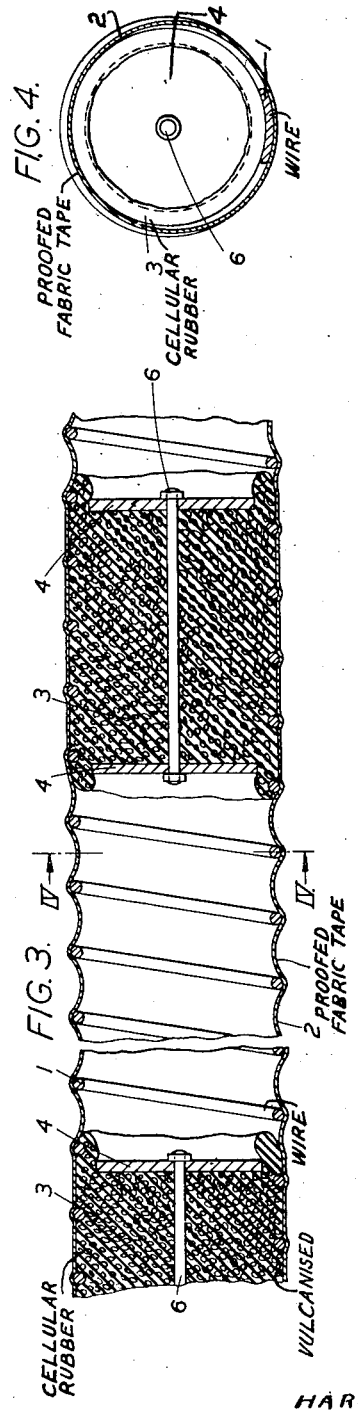
INVENTOR
HAROLD A. TUNSTALL
BY
Stebbins and Blenko
ATTORNEYS Oct. 7, 1947.  H. A. TUNSTALL  2,428,480
BUOYANT ELECTRIC CABLE
Filed Aug. 25, 1942   4 Sheets-Sheet 2

INVENTOR
HAROLD A. TUNSTALL
BY
Stebbins and Blenk
ATTORNEYS

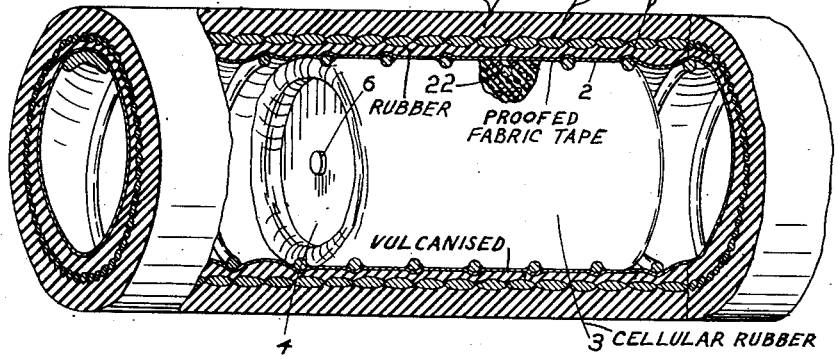
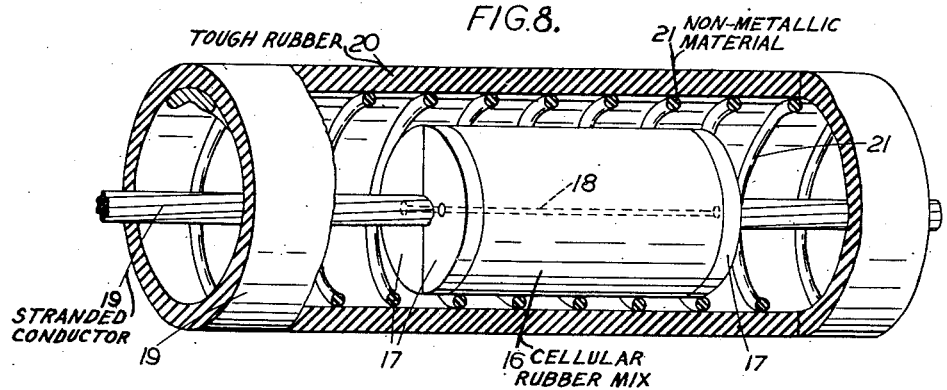
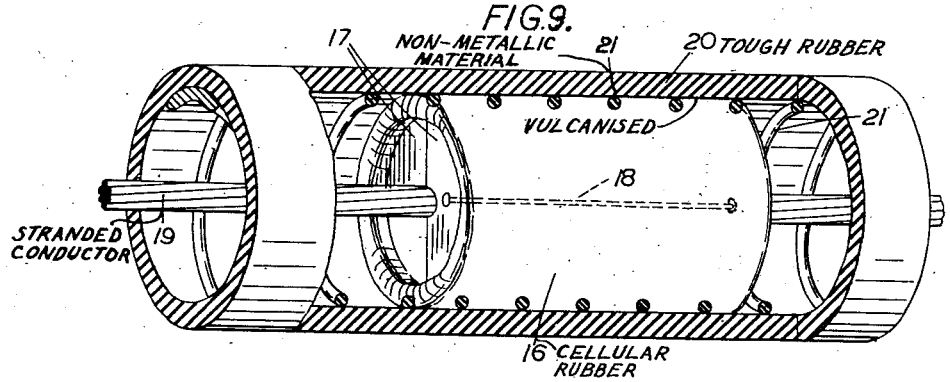

Oct. 7, 1947.   H. A. TUNSTALL   2,428,480
BUOYANT ELECTRIC CABLE
Filed Aug. 25, 1942   4 Sheets-Sheet 4

Inventor
Harold Arthur Tunstall
By
Stebbins and Blenko
His Attorneys

Patented Oct. 7, 1947

2,428,480

UNITED STATES PATENT OFFICE 2,428,480

BUOYANT ELECTRIC CABLE

Harold Arthur Tunstall, Gravesend, Kent, England, assignor to W. T. Henley's Telegraph Works Company Limited, Dorking, Surrey, England, a British company Application August 25, 1942, Serial No. 456,006
In Great Britain September 6, 1941

23 Claims. (Cl. 174—101.5)

This invention relates to the manufacture of electric cable of the kind which is rendered buoyant in water by the incorporation therein of a flexible core the length of which is extensively sub-divided to form a plurality of closed hollow cells. It is more particularly concerned with the construction of this flexible core which constitutes the buoyancy element or one of a number of such buoyancy elements. By the present invention we are enabled to provide a buoyancy element that is very flexible in a longitudinal direction but strongly resistant to radial compression and yet is extremely light. In accordance with the invention the buoyancy element comprises a longitudinally flexible helix resistant to radial compression, which is enclosed in a flexible waterproof covering and divided along its length into a plurality of closed compartments by plugs of rubber expanded in situ within the covering and having peripheral surfaces moulded to the internal surface of the covering.

In the foregoing statement and hereinafter where the context permits the term "rubber" includes natural rubber compositions and synthetic rubber-like compositions, such as, for instance, neoprene compositions, which by reason of their relevant physical properties are obvious alternatives to natural rubber compositions.

Figure 6:
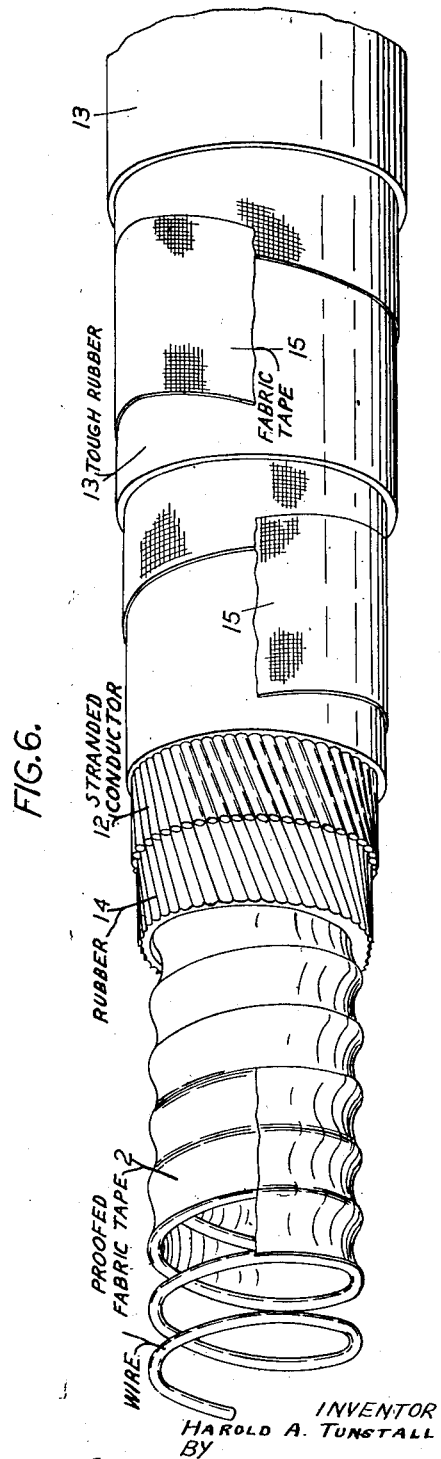
Figure 10:
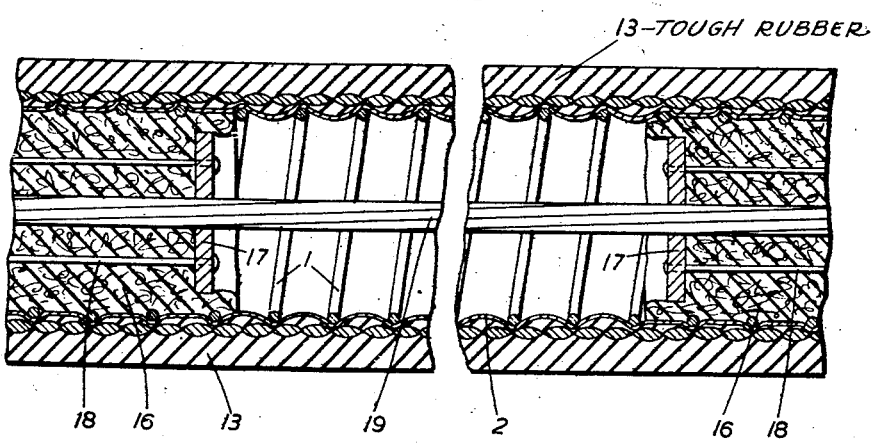

The invention will now be more fully described with frequent reference to the accompanying drawings which show, by way of example only, buoyancy elements constructed in accordance with the invention and cables embodying such elements. In the drawings, Figures 1 and 2 are respectively a longitudinal section and a cross-section of a length of one form of the improved buoyancy element, at an intermediate stage of manufacture, and Figures 3 and 4 are corresponding views of the same length of buoyancy element at a later stage of manufacture, Figure 5 is an enlarged sectional view, not strictly to scale, of a portion of the flexible waterproof covering shown in Figures 1 to 4 inclusive, Figure 6 is a perspective view of the stepped end of a buoyant electric cable incorporating a buoyancy element constructed in accordance with the invention, and Figure 7 is a perspective view of a short length of the cable shown in Figure 6 with parts cut away to expose to view a rubber plug expanded in situ, Figure 8 is a perspective view of a second form of buoyant electric cable constructed in accordance with the invention, a part of the water-proof covering and its supporting helix being cut away to expose the form of the rubber plug at an intermediate stage in the manufacture of the cable, Figure 9 is a corresponding view of the same cable at a later stage in its manufacture, Figure 10 is a longitudinal section of a length of buoyant cable having two concentric conductors and incorporating a buoyancy element constructed in accordance with the invention.

In the form of construction of buoyancy element shown in Figures 1 to 5 of the drawings the helix 1 is of open form and is made of wire of circular cross-section, but, alternatively, it may be made of wire or strip of other sections such as rectangular, channel or arcuate. Usually a steel wire will be satisfactory, but where extreme buoyancy is required a lighter metal or alloy may be employed. Instead of a helix of metal wire or strip a helix of hard non-metallic material may be used, as in the form of construction shown in Figures 8 and 9 to which reference will be made later. Examples of suitable non-metallic materials are hard rubber and synthetic plastics such as cellulose acetate or other cellulose derivatives, polyvinylchloride or other polyvinyl derivatives, all suitably plasticised.

The nature of the water-proof covering enclosing the helix 1 will depend upon whether it will constitute an internal or an external part of the cable. The covering 2 of the buoyancy element shown in Figures 1 to 5 is intended to constitute an internal part of the cable and is built up of rubber proofed cotton fabric tape. In the particular example shown, a single tape is used which is applied helically on the helix with about 66% overlap so that a composite covering of three layers thickness is obtained. This is so applied that it forms a transversely corrugated wall, a shape which results in a covering of great flexibility. However, where the covering enclosing the helix forms an external part of the cable, a covering of tough rubber, such as the covering shown in Figures 8 and 9 will be advisable.

The expanded plugs 3 which divide the covered helix 1 into a plurality of closed compartments are of cellular rubber, by which is meant a cellular mass of vulcanised rubber having non-intercommunicating cells. These plugs are formed by introducing into the helix at frequent intervals in the length thereof, for instance, intervals of several feet, plugs made of a cellular rubber mix, and by the term "cellular rubber mix" we mean an unvulcanised rubber mix from which vulcanised cellular rubber is obtainable by subjecting it to an appropriate heat treatment, whether it be a mix containing special ingredients, for instance, a mix containing appropriate amounts of accelerator and an organic material such as diazoamino benzene, capable of dissolving in the mix and decomposing on heating with evolution of gas, or a mix which has been pre-treated in some special manner, for instance, by introducing inert gases under pressure. The plugs 3 are subsequently heat treated to expand them and mould their peripheral surfaces to the internal surface of the water-proof covering 2 thereby to divide the interior of the buoyancy element into closed compartments. To avoid undue reduction in the buoyancy of the element, the plugs 3 should be of limited length. It will, therefore, generally be necessary to limit the expansion of the plug in a longitudinal direction and concentrate the expansion in a radial direction. In making the buoyancy element shown in Figures 1 to 5 of the drawings, this is effected by means of a pair of discs 4 held in spaced relationship by a central member 5 so as to form a spool on which a thick tape of the cellular rubber mix is applied spirally to form the rubber plug 3. Alternatively a split cylinder of the mix may be inserted laterally on the spool. The discs 4 may be of hard rubber, hard fibre, wood or light metal, for instance, an aluminium alloy. The central member may be a rigid member 5 whose projecting ends may be upset as at 6, or, in the case of a wire, bent over. Alternatively, the spool may simply consist of a pair of discs coupled together by a flexible wire or cord to limit their outward movement under the influence of the pressure arising from the expansion of the rubber between them during its heat treatment. The diameter of the discs 4 and the external diameter of the unexpanded rubber plug 3 is preferably of the order of 85 to 90% of the internal diameter of the helix. This enables the plugs and their supports to be readily inserted in the helix. This is preferably done as the manufacture of the helix proceeds but it is not essential in cases where it is not necessary that the peripheral surface of the plug should be vulcanised to the internal surface of the covering, for the spools carrying the plugs may then be coated with French chalk, or the like, strung together and drawn in subsequently by means of a draw-in wire introduced into the helix I during its manufacture. In the latter case the circumferential surfaces of the discs 4 should be well rounded so that they will ride readily over the turns of the helix. As shown in Figures 1 and 2, the plugs initially rest on the bottom of the helix. During the expansion process the plug becomes centralised so that the adjacent turns of the helix become embedded in its circumferential surface, the parts of that surface between the embedded turns making joint with the internal surface of the covering, as shown in Figures 3 and 4.

It will be observed that in the completed element shown in Figures 3 and 4 the cellular rubber does not make joint with the entire peripheral surface of the overlying turns of the helix. As a result, a pair of small helical channels exist between the plug 3 and the water-proof covering 2 which serve to place the adjacent compartments of the element in communication with one another to a very limited extent. For some purposes this does not matter, but where it is necessary that the plug should constitute an absolutely water-tight barrier precautions should be taken to eliminate these channels or interrupt their continuity, for instance, by employing a very soft mix which will flow readily during its expansion or by painting the appropriate part of the helix with a solution of a rubber mix which may have the same composition as the cellular mix. Alternatively, at one or more places the helix may be locally deformed, as indicated by the reference numeral 22 in Figure 7, so as to lie away from the wall of the covering and in contact with the plug in its expanded state, or in cases where it does not serve during the manufacture of the buoyancy element as the principal supporting member, it may be severed. It is also advantageous when a water-tight partition is essential, to take precautions to ensure that the entire peripheral surface of the plug becomes vulcanised to the internal surface of the water-proof covering during the heat treatment of the plug.

An example of a cellular rubber mix suitable for making plugs of the form described with reference to Figures 1 to 5 is as follows:

| | Parts by weight |
|---|---|
| Rubber | 76.23 |
| Zinc oxide | 4.0 |
| Stearic acid | 4.0 |
| Petroleum jelly | 11.0 |
| Nonox | 0.7 |
| Sulphur | 1.9 |
| Mercaptobenzothiazole | 0.6 |
| Tetramethylthiuramdisulphide | 0.07 |
| Diazoaminobenzene | 1.5 |

The appropriate heat treatment will naturally depend to some extent on the size of the buoyant element but for an element of about 1.75 inches overall diameter a suitable treatment consists in warming up the covered helix with steam at atmospheric pressure for 30 minutes, gradually increasing the steam pressure to 40 lbs. per square inch during a succeeding period of 60 minutes, maintaining a steam pressure of 40 lbs. per square inch for a further period of 10 minutes and thereafter gradually releasing the steam pressure. In some cases it may be preferable to use plugs of hard cellular rubber instead of soft cellular rubber, in which event a treatment appropriate to a mix of hard cellular rubber will be employed.

In constructing, in accordance with our invention, a heavy current cable of the kind having a conductor built up of a large number of small diameter wires laid round a core of large diameter, constituting the buoyancy element, and enclosed in a sheath of tough vulcanised rubber, it is at present preferred to make the buoyancy element independent of the outer sheath in order to avoid any possible difficulties in obtaining a joint between the expanded plugs and this outer sheath, which is separated from them by the hollow conductor. That is to say, it is preferred to apply a water-proof covering directly to the helix, to lay up the conductor wires over this covering and then to apply the outer tough rubber sheath. Figures 6 and 7 of the drawings show an example of such a cable. The buoyancy element is similar to that described with reference to Figures 1 to 5 of the drawings and consists of an open steel wire helix I wrapped helically with cotton tape 2 proofed on the inside and applied with overlap as shown in Figure 5. The plugs 3 are of soft cellular rubber. The conductor 12 may be stranded directly on the taped helix and furnished with a covering 13 of tough rubber. By appropriate choice of accelerators, the plugs can be expanded and vulcanised to the internal surface of the taped covering on the helix and the outer covering of tough rubber can be vulcanised, in a single heat treatment. For example, if the plugs are made from a cellular rubber mix of the composition given above and the outer sheath by extrusion of a mix consisting of:

| | Parts by weight |
|---|---|
| Rubber | 61.0 |
| Paraffin wax | 0.9 |
| Stearic acid | 2.4 |
| Zinc oxide | 3.0 |
| Sulphur | 1.7 |
| Carbon black | 29.6 |
| Mercaptobenzothiazole | 0.5 |
| Nonox | 0.9 | an appropriate heat treatment comprises warming up the cable with steam at atmospheric pressure for 30 minutes, followed by gradual increase of steam pressure to 40 lbs. per square inch during 60 minutes, followed by maintenance of a steam pressure of 40 lbs. per square inch for 10 minutes, followed by gradual release of steam pressure. Additional security against longitudinal seepage of water in the event of damage to the outer covering is obtained by using for the covering 2 a fabric tape proofed on both sides and by applying a layer 14 of rubber over the taped covering before applying the conductor 12, so that after vulcanisation the seal extends from the plug 3, through the fabric cover 2 and the spaces between the conductor wires 12, to the outer tough rubber covering 13. In the latter there may be incorporated one or more fabric tapes 15 for reinforcing purposes, in which event it will be extruded in two or more layers or built up of lappings of tape, the layers of rubber mix with a high carbon black content being interleaved with layers having a low carbon black content, for instance, layers of a mix of the following composition:

| | Parts by weight |
|---|---|
| Rubber | 81.6 |
| Paraffin wax | 1.95 |
| Carnauba wax | 4.9 |
| Light magnesium carbonate | 4.9 |
| Zinc oxide | 2.5 |
| Sulphur | 2.2 |
| Carbon black | 0.1 |
| Stearic acid | 1.2 |
| Mercaptobenzothiazole | 0.65 |

In applying the invention to the construction of single core buoyant cables of the kind in which the conductor is disposed within the buoyancy element, the covering enclosing the helix may be of tough rubber and serve also as the outer sheath, and the expanded plugs serving to divide the covered helix into water-tight or substantially water-tight compartments, or the formers on which such plugs are carried, also serve as supports for the conductor. For some purposes it may be desirable with cables of this kind to make the helix of insulating material, for instance, of any one of the aforesaid synthetic plastics. In the example of construction shown in Figure 8, the plug 16 consisting of a cellular rubber mix is introduced in two halves, each of semi-annular form. Each half is pre-moulded to shape between two semi-annular end plates 17 of hard fibre anchored by a wire 18. These are fitted on the conductor 19, preferably just before the application of the open helix thereto, and will be held together by adhesion. A water-proof covering 20 of rubber is applied to the helix 21 and the cable is heat-treated to vulcanise the covering and to expand the plugs and unite them to the covering to form the completed cable shown in Figure 9. During this process the conductor will become substantially centralised.

In the case of cables with one or more conductors within the buoyancy element and having, in addition, an insulated outer conductor, for instance, twin concentric cables, the water-proof covering for the helix may be of the kind described with reference to Figures 1 to 5, and the outer conductor be provided with a tough rubber covering which may be tight jointed to the inner covering on the helix. Figure 10 shows such a cable, the same reference numerals being used in this figure as those used for corresponding parts in Figures 7 and 9.

What I claim as my invention is:

1. In a tubular buoyancy element comprising a longitudinally flexible helix resistant to radial compression and a flexible waterproof covering enclosing said helix, means, comprising expanded rubber plugs within said covering and having peripheral surfaces moulded to and closely fitting the internal surface thereof, for dividing the interior of the element into a plurality of closed compartments.

2. In a tubular buoyancy element comprising a longitudinally flexible helix resistant to radial compression and a flexible waterproof covering enclosing said helix, means, comprising a number of expanded plugs of cellular rubber within said covering and having peripheral surfaces moulded to and closely fitting the internal surface thereof, for dividing the interior of the element into a plurality of closed compartments.

3. In a tubular buoyancy element comprising a longitudinally flexible helix resistant to radial compression and a flexible waterproof covering enclosing said helix, means, comprising a number of expanded plugs of cellular rubber within said covering and having peripheral surfaces moulded to and closely fitting and vulcanised to the internal surface thereof, for dividing the interior of the element into a plurality of closed compartments.

4. A tubular buoyancy element comprising an open helix resistant to radial compression, a covering enclosing said helix and consisting of at least one helical lapping of proofed fabric tape, and means, comprising a number of expanded plugs of soft cellular rubber within said covering and having peripheral surfaces moulded to and closely fitting the internal surface of said covering, for dividing the interior of the element into a plurality of closed compartments.

5. A tubular buoyancy element comprising an open helix resistant to radial compression, a covering enclosing said helix and consisting of at least one helical lapping of proofed fabric tape, and means, comprising a number of expanded plugs of soft cellular rubber within said covering and having peripheral surfaces moulded to and closely fitting and vulcanised to the internal surface of said covering, for dividing the interior of the element into a plurality of closed compartments.

6. A buoyant electric cable comprising an open helix resistant to radial compression, a waterproof covering enclosing said helix, a conductor consisting of wires laid round said helix, and means, comprising rubber plugs expanded within said covering and having peripheral surfaces moulded to and closely fitting the internal surface of said covering whereby to divide the interior of the cable into a plurality of closed compartments.

7. A buoyant electric cable comprising an open helix resistant to radial compression, a waterproof covering enclosing said helix, a conductor consisting of wires laid round said helix, and means, comprising rubber plugs expanded within said covering and having peripheral surfaces moulded and vulcanised to the internal surface of said covering, for dividing the interior of the cable into a plurality of closed compartments.

8. A buoyant electric cable comprising an open helix resistant to radial compression, a flexible water-proof covering enclosing said helix, a flexible sheath of tough rubber enclosing the said covering, a conductor consisting of a number of helically extending wires embedded in the wall of said sheath, and means, comprising a plurality of rubber plugs expanded within said water-proof covering and having peripheral surfaces moulded to the internal surface thereof, for dividing the interior of the cable into a plurality of compartments.

9. A buoyant electric cable comprising an open wire helix, a covering enclosing said helix and consisting of at least one helical lapping of proofed fabric tape, a flexible sheath of tough rubber surrounding said fabric covering, a conductor consisting of wires embedded in the wall of said sheath and means for dividing the interior of the cable into a plurality of water-tight compartments, said means comprising a plurality of rubber plugs expanded within said fabric covering and having peripheral surfaces moulded and vulcanised to the internal surface of said sheath through the fabric covering.

10. A buoyant electric cable comprising a longitudinally flexible helix that is of insulating material and resistant to radial compression, a conductor located in spaced relation to and within said helix, a flexible sheath of insulating material enclosing said helix and means for dividing the interior of said cable into closed compartments, said means comprising a plurality of rubber plugs expanded on said conductor and within the sheath and having external surfaces moulded to the internal surface of said sheath and internal surfaces moulded to the external surface of the conductor.

11. A buoyant electric cable comprising a longitudinally flexible helix that is of insulating material and resistant to radial compression, a conductor located in spaced relation to and centrally within said helix, a flexible sheath of insulating material enclosing said helix and means for dividing the interior of said cable into water-tight compartments, said means comprising a plurality of annular rubber plugs expanded between said conductor and said sheath and having external surfaces moulded to the internal surface of said sheath and having internal surfaces moulded to the external surface of said conductor.

12. A method of making an elongated buoyancy element, comprising positioning within a longitudinally flexible helix resistant to radial compression a plurality of masses each consisting of a cellular rubber mix, providing said helix with a flexible water-proof covering, and heat treating said masses to expand them and mould their peripheral surfaces to the internal surfaces of said covering, whereby to divide the interior of the said element into closed compartments.

13. A method of making an elongated buoyancy element, comprising positioning within a longitudinally flexible helix resistant to radial compression a plurality of masses each consisting of a cellular rubber mix, providing said helix with a flexible water-proof covering, and heat treating said masses to expand each in a radial direction to mould its peripheral surface to the internal surface of said covering whilst restricting its expansion in a longitudinal direction, whereby to divide the interior of said element into closed compartments.

14. A method of making an elongated buoyancy element, comprising introducing into a longitudinally flexible helix resistant to radial compression a plurality of masses, each consisting of a cellular rubber mix, while each said mass is confined between a pair of spaced discs coupled together, enclosing said helix in a water-proof covering and heat treating each mass to expand it and mould its peripheral surface to the internal surface of said covering, whereby to divide the interior of said element into closed compartments.

15. A method of making a buoyant electric cable which comprises inserting expansible plugs of rubber in an open helix, providing said helix with a water-proof covering of rubber containing in the wall thereof a plurality of helically extending conductor wires and subjecting the whole to a single heat treatment to expand said plugs and mould the peripheral surfaces thereof to the internal surface of said covering and vulcanise said plugs and said covering to one another, whereby to divide the interior of said cable into a plurality of closed compartments.

16. In a tubular buoyancy element comprising a longitudinal flexible helix resistant to radial compression and a waterproof covering enclosing said helix, means comprising a number of plugs for dividing the interior of the element into a plurality of closed compartments, each of which number comprises a pair of transversely extending walls held in spaced relationship within said helix and expanded cellular rubber within said covering and between said pair of walls, said rubber having peripheral surfaces moulded to and closely fitting the internal surface of said covering and end surfaces moulded to said transversely extending walls.

17. In a tubular buoyancy element comprising a longitudinally flexible helix resistant to radial compression and a flexible waterproof covering enclosing said helix, means comprising expanded plugs of rubber within said covering and having peripheral surfaces closely fitting the exposed surface of the helix and the internal surface of the said covering exposed between the turns of said helix, for dividing the interior of the element into a plurality of closed compartments.

18. In a tubular buoyancy element comprising a longitudinally flexible helix resistant to radial compression and a flexible waterproof covering enclosing said helix, means comprising expanded plugs of rubber within said covering and having peripheral surfaces closely fitting the exposed surface of the helix and bonded to the internal surface of the said covering exposed between turns of said helix, whereby to divide the interior of the element into a plurality of closed compartments.

19. In a tubular buoyancy element comprising a longitudinally flexible helix resistant to radial compression and a flexible waterproof covering enclosing said helix, means, comprising rubber plugs in a state of elastic compression disposed within said covering and having peripheral surfaces moulded to and closely fitting the internal surface thereof, for dividing the interior of the element into a plurality of closed compartments.

20. In a tubular buoyancy element comprising a longitudinally flexible helix resistant to radial compression and a flexible waterproof covering enclosing said helix, means, comprising a number of cellular rubber plugs in a state of elastic compression located within said covering and having peripheral surfaces moulded to and closely fitting the internal surface of said covering for dividing the interior of the element into a plurality of closed compartments.

21. A tubular buoyancy element comprising an open helix resistant to radial compression, a covering enclosing said helix and consisting of at least one helical lapping of proofed fabric tape, and means, comprising a number of soft cellular rubber plugs in a state of elastic compression within said covering and having peripheral surfaces moulded to and closely fitting the internal surface of said covering, for dividing the interior of the element into a plurality of closed compartments.

22. In a tubular buoyancy element comprising a longitudinally flexible helix resistant to radial compression and a waterproof covering enclosing said helix, means, comprising a number of plugs for dividing the interior of the element into a plurality of closed compartments, each of which number comprises a pair of transversely extending walls held in spaced relationship within said helix and a cellular rubber body held in a state of elastic compression within said covering and between said pair of walls and having peripheral surfaces moulded to and closely fitting the internal surface of said covering and end surfaces moulded to said transversely extending walls.

23. In a tubular buoyancy element comprising a longitudinally flexible helix resistant to radial compression and a flexible waterproof covering enclosing said helix, means, comprising rubber plugs in a state of elastic compression within said covering and having peripheral surfaces moulded to and closely fitting the exposed surface of the helix and the internal surface of said covering exposed between the turns of said helix, for dividing the interior of the element into a plurality of closed compartments.

HAROLD ARTHUR TUNSTALL.

REFERENCES CITED

The following references are of record in the file of this patent:

UNITED STATES PATENTS

| Number | Name | Date |
| --- | --- | --- |
| 2,048,811 | Peirce | July 28, 1936 |
| 2,186,793 | Wodtke | Jan. 9, 1940 |
| 1,977,325 | Pfannkuch | Oct. 16, 1934 |
| 2,304,210 | Scott | Dec. 8, 1942 |
| 2,243,881 | Peters | June 3, 1941 |
| 411,161 | Maynard | Sept. 17, 1889 |
| 165,324 | Greacen | July 6, 1875 |
| 1,394,300 | Gammeter | Oct. 18, 1921 |
| 568,870 | Nicholls | Oct. 6, 1896 |
| 790,971 | Nicholls | May 30, 1905 |
| 2,197,616 | Lehne | Apr. 16, 1940 |
| 2,176,762 | Forbes | Oct. 17, 1939 |

FOREIGN PATENTS

| Number | Country | Date |
| --- | --- | --- |
| 459,179 | Germany | Apr. 26, 1928 |
| 312,464 | Great Britain | May 30, 1929 |